United States Patent [19]

Larkin

[11] 4,180,102
[45] Dec. 25, 1979

[54] SEWER CONNECTOR

[76] Inventor: Derek J. Larkin, 1541 Morene Way, Modesto, Calif. 95355

[21] Appl. No.: 970,868

[22] Filed: Dec. 14, 1978

[51] Int. Cl.² .............................................. B65D 59/04
[52] U.S. Cl. .................................... 138/106; 138/107; 138/110; 138/121; 206/446
[58] Field of Search ............... 138/106, 110, 107, 121, 138/122, 109; 206/446; 285/373, 419; 248/80

[56] References Cited

U.S. PATENT DOCUMENTS

| 2,700,988 | 2/1955 | Smisko | 138/110 |
| 2,836,200 | 5/1958 | Webbe | 138/110 |
| 3,621,994 | 11/1971 | Brown | 206/446 |
| 3,924,661 | 12/1975 | Bornhoffer | 138/110 |
| 4,103,943 | 8/1978 | Curtin | 285/419 |
| 4,109,944 | 8/1978 | Curtin | 285/373 |

Primary Examiner—Lenard A. Footland
Attorney, Agent, or Firm—Clarence A. O'Brien; Harvey B. Jacobson

[57] ABSTRACT

The sewer connector comprises an axially compressible hose and a storage container for maintaining the hose or any portion thereof in the compressed state. The container consists of a pair of semi-cylindrical housing portions having soft foam rubber strips which are connected to the inner periphery of the axial ends of each housing section. Slip rings are also provided for maintaining the two housing sections in radial opposition about the flexible hose thereby forming a cylindrical housing with the rubber strips holding the flexible hose in its compressed state.

7 Claims, 3 Drawing Figures

SEWER CONNECTOR

BACKGROUND OF THE INVENTION

1. Field of the Invention

This invention relates to sewer connectors for recreational vehicles and especially to such sewer connectors which incorporate housings for the convenient storage of same.

2. Description of the Prior Art

Flexible connector hoses are conventionally used for connecting the waste drain of a recreational vehicle holding tank with a ground sewer connection. Such flexible hoses provide a convenient attachment device but are nevertheless endowed with certain inherent deficiencies. For instance, when carrying the hose, it is necessary to support it at several points in order to be sure that it will not drag upon the ground thereby causing injury to the hose. Furthermore, when attached for use, the hose should provide a straight line connection to the ground sewer in order that the sewage from the recreational vehicle will drain properly and not remain trapped within the hose itself.

In an attempt to overcome such deficiencies, a storage container has been developed as disclosed in U.S. Pat. No. 3,924,661, issued Dec. 9, 1975 to Bornhoffer. The Bornhoffer storage container comprises a cylindrical tubing element having a single axial slit thus allowing the element to expand to accept a compressed flexible hose therein. The construction shown by Bornhoffer has certain inherent disadvantages including the fact that direct contact is made between the hard casing element and the flexible hose thereby causing dents and chaffing to occur in the hose creating permanent injury thereto. Furthermore, the Bornhoffer device makes it inconvenient for inserting the hose into and removing the hose from the casing.

SUMMARY OF THE INVENTION

An object of the present invention is to provide a sewer connector device including a two-part housing enclosing a flexible hose and thus allowing convenient access to the housing interior for inserting the hose into and removing the hose from the interior.

Another object of the present invention is to provide a sewer connector including circumferential pads which form the connection with the flexible hose in order to avoid contact between the housing and the hose thereby eliminating any possible damage to the hose.

A still further object of the present invention is to provide a sewer connector stand for holding the connector at a position spaced above the ground when not in use.

Yet another object of the present invention is to provide a sewer connector which includes slip rings for holding the two-part housing together which slip rings may conveniently be moved upon the housing to allow separation of the two parts of the housing.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
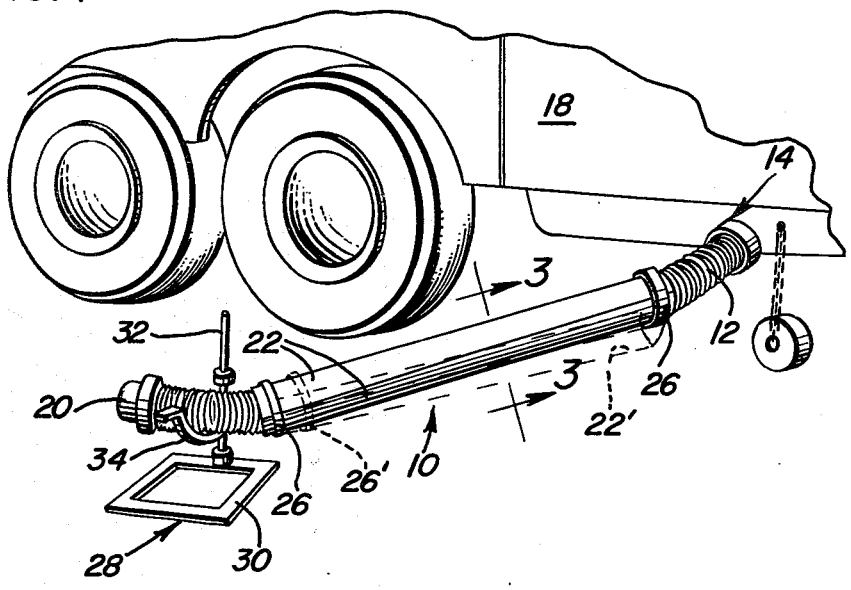
FIG. 1 is a perspective view of the sewer connector attached to a recreational vehicle.
Figure 2:
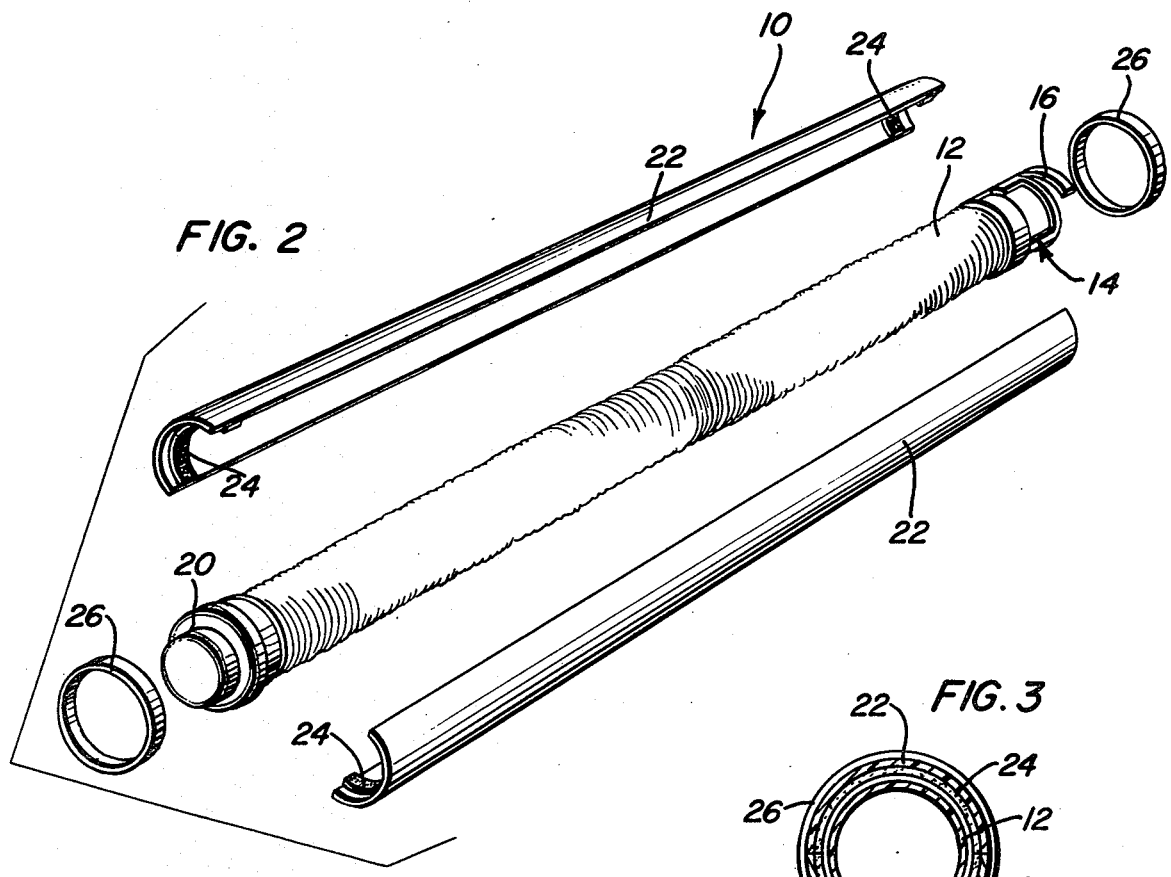
FIG. 2 is an exploded view of the sewer connector showing the constitutent elements thereof.
Figure 3:
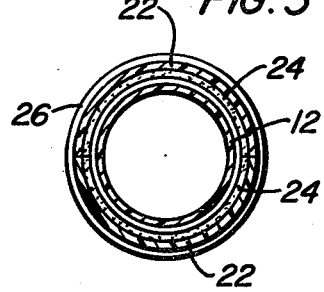
FIG. 3 is a sectional view taken substantially along a plane passing through section line 3—3 of FIG. 1.

Now with reference to the drawings, the sewer connector generally referred to by the numeral 10 will be described in detail. The sewer connector includes a length of standard flexible hose 12 which is typically compressible in an axial direction for providing a convenient compact configuration. Such hoses are normally designed to extend to a full length of approximately 20 feet and compress to a length of approximately 3 feet. The hose 12 has a plastic connector 14 at one end thereof. The connector has radially opposed bayonet slots 16 for connection to recreational vehicle 18. The opposite end of the hose has affixed thereto a second connector 20 which may be simply an extension or a threaded device for connection to the existing ground sewer line.

The sewer connector housing structure comprises two identical semi-cylindrical housing halves 22. The housing halves 22 may be produced from a single piece of cylindrical tubing portion which is split in half. Each housing half 22 is preferably made of polyvinyl chloride or any other suitable plastic material. The housing halves 22 fit together and form a cylindrical housing cover for the hose 12. The cylindrical housing cover should have an interior diameter which is slightly greater than the exterior diameter of the hose 12. A strip of foam rubber material 24 is affixed by gluing or any other suitable means to the interior of each end of each housing half 22. Foam rubber strips 24 are the only other elements of the housing structure to make contact with hose 12. In order to hold the halves 22 together and apply pressure from the foam rubber strips 24 to the hose 12, rings 26 are provided and are slipped over the ends of the housing halves 22. Rings 26 are preferably made of the same plastic material as the housing halves 24 and have an inside diameter equal to the outside diameter of the housing. With rings 26 in place, the two halves 22 are firmly held together and pressure is applied by the foam rubber stips 24 to the hose 12 thus preventing the hose from being extended or contracted axially.

In use, with connector 14 attached to the recreational vehicle 18, one or the other ring 22 may be removed or slid to the opposite end of the housing as shown in FIG. 1 at 26'. In this manner, the ring-free end may easily be opened for access to the interior of the housing to facilitate the insertion thereinto or removal therefrom of hose 12, as illustrated in FIG. 1 by displayed housing half 22' shown in phantom.

A sewer connector stand 28 as shown in FIG. 1, is also provided for conveniently holding the sewer connector vertically above the ground. The stand 28 includes a rectangular base frame 30 having a vertical rod 32 connected to one section thereof. Slidably disposed upon rod 32 is U-shaped holder 34 in which the hose 12 or housing 22 may be disposed. The holder 34 may be made of any suitable plastic or metal material and may be attached to rod 32 by the use of set screws, thumb screws or any other suitable engagement means.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A connector device comprising in combination:
    a flexible hose for carrying fluids therethrough, said hose being axially compressible and expandable for changing the working length of said hose; and
    a housing comprising a pair of substantially semi-cylindrical housing halves for surrounding and protecting said hose, each housing half have a length which is substantially less than the extended length of said hose, engagement means disposed within and connected to said housing for engaging the outer periphery of said hose without causing injury to said hose by contact therewith, attachment means for providing a connection between the two housing halves for forming a firm engagement about said hose and forcing said engagement means into contact with said hose.

2. The device of claim 1 wherein said attachment means comprises a pair of annular rings having an inside diameter equal to the outside diameter of the said housing, said rings being slidably disposed in surrounding relation to said housing halves for holding said housing halves firmly together.

3. The device of claim 1 wherein said engagement means includes a strip of soft material attached to the interior circumference of each end of each housing half such that the soft material engages said hose when the housing halves are placed about said hose.

4. The device of claim 3 wherein said attachment means includes a pair of annular rings having an inside diameter equal to the outside diameter of said housing, said rings being disposed about the housing for holding said housing halves together.

5. The device of claim 1 wherein each housing half is produced from a semi-rigid plastic material.

6. The device of claim 1 wherein said hose has a connection means at one end for connecting said hose to the sewer outlet of a recreational vehicle.

7. The device of claim 1 and further in combination with a stand comprising a base, an upright rod, and a lateral extension slidably disposed on said rod for supporting said hose or said housing.

* * * * *